United States Patent [19]

Maekawa

[11] Patent Number: 5,071,322
[45] Date of Patent: Dec. 10, 1991

[54] WATERPROOF STRUCTURE FOR FAN MOTOR

[75] Inventor: Hirohiko Maekawa, Kiryu, Japan
[73] Assignee: Mitsuba Electric Manufacturing Co., Ltd., Gunma, Japan
[21] Appl. No.: 642,418
[22] Filed: Jan. 17, 1991
[30] Foreign Application Priority Data Jan. 19, 1990 [JP] Japan .................. 2-3838[U]

[51] Int. Cl.⁵ ............... F04B 17/00; B63H 1/28
[52] U.S. Cl. .................. 417/423.7; 417/424.1; 416/244 B; 416/245 A
[58] Field of Search ............. 417/423.7, 424.1, 352, 417/353; 416/93 R, 244 B, 245 R, 245 A

[56] References Cited

U.S. PATENT DOCUMENTS

| | | | |
|---|---|---|---|
| 3,993,415 | 11/1976 | Hauser | 416/93 R |
| 4,097,191 | 6/1978 | Genuardi | 416/244 B |
| 4,930,987 | 6/1990 | Stahl | 416/244 B |

FOREIGN PATENT DOCUMENTS 2083865  3/1982  United Kingdom ............ 417/423.7

Primary Examiner—Richard A. Bertsch
Assistant Examiner—Alfred Basichas
Attorney, Agent, or Firm—Oliff & Berridge

[57] ABSTRACT

A waterproof structure for a fan motor comprising a vertical motor shaft projecting from the lower surface of a motor yoke and a fan boss portion which has a bottomed cylindrical shape formed by a bottom opposite to the lower surface of the motor yoke, an outer cylinder opposite to the outer periphery of the motor yoke and which is mounted on the motor shaft at the center thereof. The bottom of the fan boss portion, opposite to the lower surface of the motor yoke is partitioned by concentric circular ribs to form a plurality of enclosed rooms having floors which are successively lower in the direction toward the outer periphery and notches for allowing the adjacent enclosed rooms to communicate with each other are formed in the ribs in such a manner that the notches of the adjacent ribs are offset from one another so as to be placed on different radial lines. The structure produces a maze-like water guide passage for guiding water, which may enter the fan boss portion, from the inner to the outer enclosed rooms where drainage holes are formed in the floors of the enclosed rooms in the outermost periphery for the purpose of discharging the water guided thereto to outside of the fan boss portion. The waterproof structure thus provides excellent waterproofing capability that results in increased reliability of the fan motor.

8 Claims, 2 Drawing Sheets

5,071,322

WATERPROOF STRUCTURE FOR FAN MOTOR

BACKGROUND OF THE INVENTION

The present invention relates to a waterproof structure for a fan motor installed in vehicles such as automobiles and trucks.

Conventional fan motors for cooling vehicle capacitors and similar components are configured so that a fan boss portion is mounted on the vertical motor shaft projecting from the lower surface of a motor yoke. Such fan motors are fitted to, for example, the lower portion of a vehicle.

However, since a water-barrier for protecting the complete underside of a vehicle is normally not provided, the motor shaft of a fan motor is sometimes directly splashed with water when the lower portion of the vehicle body is splashed with water during a rain or while the vehicle is being washed. It is therefore necessary to take measures to waterproof the fan motor. In a case of a fan motor having a vertical motor, as described above, when the fan boss portion is formed into a bottomed cylindrical shape having an open upper portion, a bottom opposite to the lower surface of the motor yoke and an outer cylinder opposite to the outer periphery of the motor yoke to protect the motor from being directly splashed by water splashing the lower portion of the vehicle, the water which enters the fan boss portion cannot be easily discharged to the outside, and thus may enter the fan motor. To correct this problem it is necessary to take measures that effectively protect the fan motor from the retained water.

SUMMARY OF THE INVENTION

The present invention addresses the identified problem discussed above. It is an object of the present invention to provide a waterproof structure for a fan motor which is capable of removing water that enters the fan boss portion.

To this end, the present invention provides a waterproof structure for a fan motor having a vertical motor shaft projecting from the lower surface of a motor yoke, comprising a fan boss portion which has a bottomed cylindrical shape formed by a bottom opposite to the lower surface of the motor yoke and an outer cylinder opposite to the outer periphery of the motor yoke and which is mounted on the motor shaft at the center thereof, wherein the bottom surface of the fan boss portion, opposite to the lower surface of the motor yoke, is partitioned by concentric circular ribs to form a plurality of enclosed rooms having floors which are successively lower in the direction toward the outer peripheral side, and notches for allowing the adjacent enclosed rooms to communicate with each other are formed in the ribs in such a manner that the notches of the adjacent ribs are offset from one another so as to be on different radial lines. The structure produces a maze-like water guide passage for guiding water, which may enter the fan boss portion, from the inner to the outer enclosed rooms where drainage holes are formed in the floors of the enclosed rooms in the outermost periphery for the purpose of discharging the water guided thereto to outside of the fan boss portion.

BRIEF DESCRIPTION OF THE DRAWINGS

The drawings show an embodiment of a waterproof structure for a fan motor in accordance with the present invention in which.

DESCRIPTION OF PREFERRED EMBODIMENT

Figure 1:
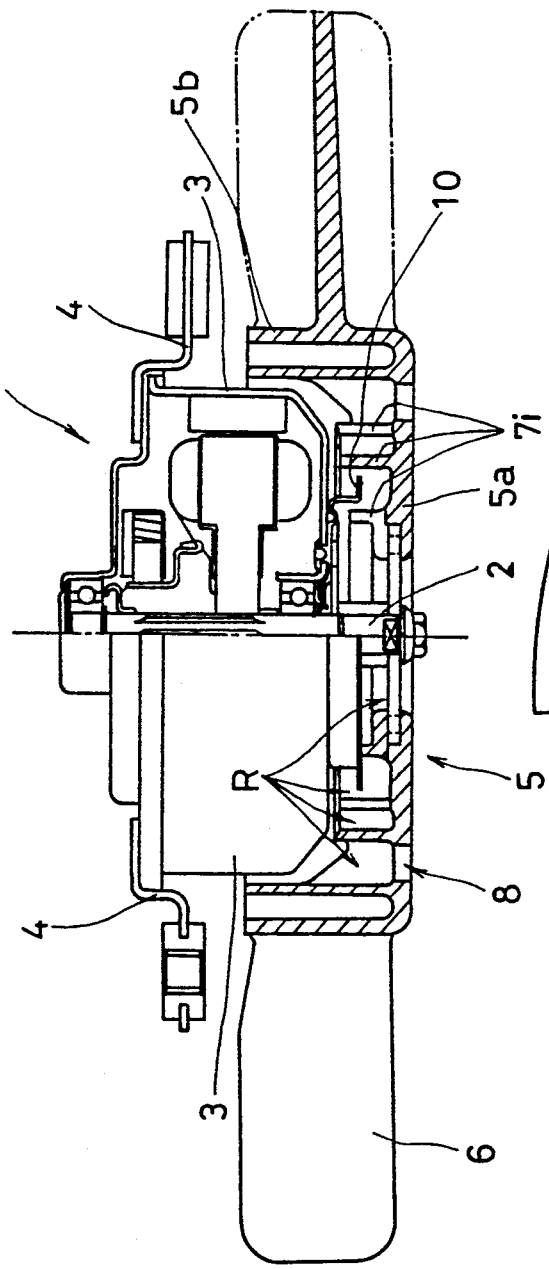
FIG. 1 is a partially sectional side view of a fan motor.
Figure 2:
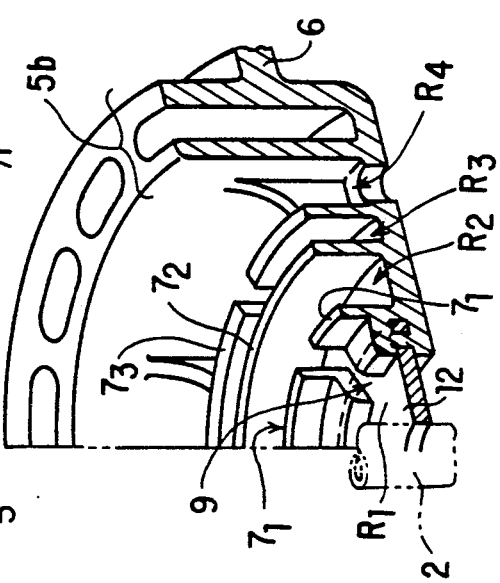
FIG. 2 is a partial perspective, cross-sectional view of a portion of a fan boss portion.
Figure 3:
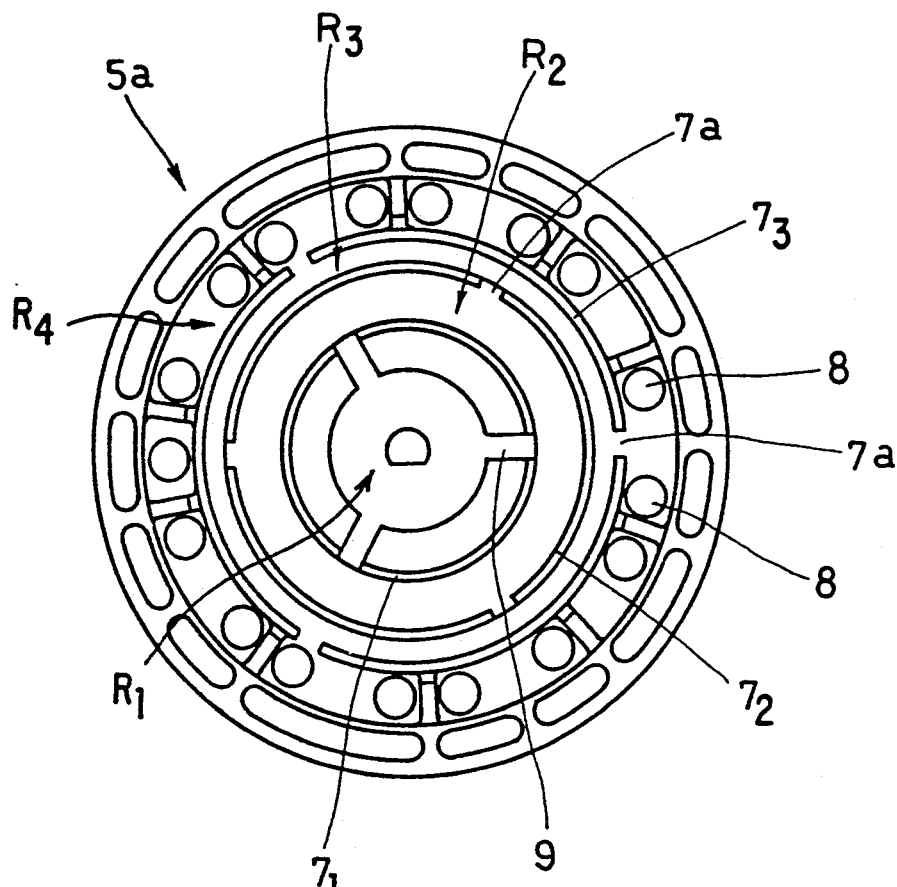
FIG. 3 is a plan view of the bottom of a fan boss portion.
Figure 4:
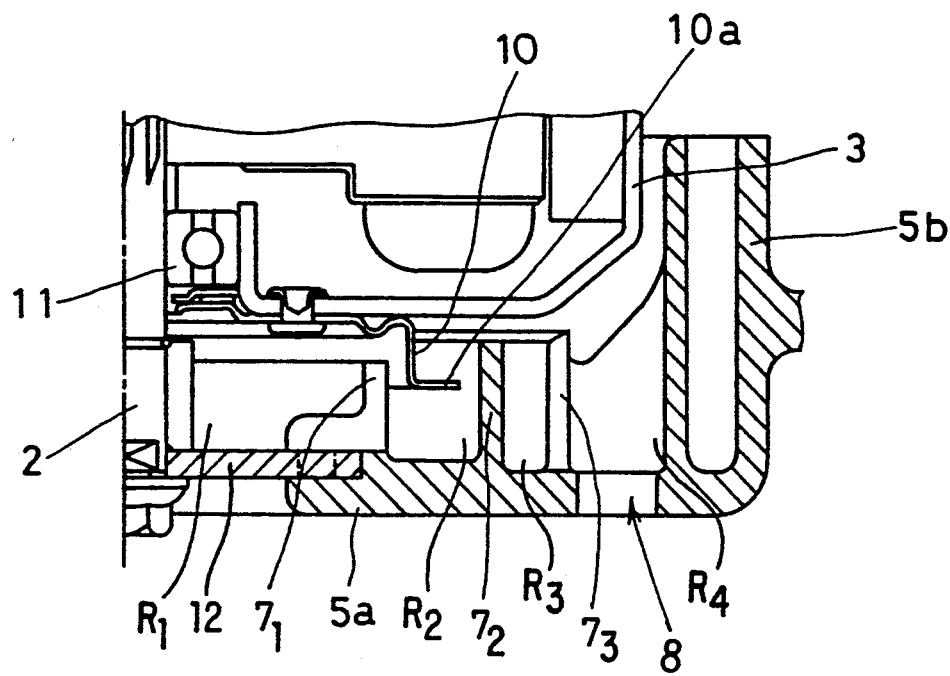
FIG. 4 is an enlarged sectional view of a principal portion of the fan motor.

An embodiment of the present invention is described below with reference to the drawings. A fan motor having a motor yoke 3 is mounted to the lower portion of a vehicle, such as a car or similar vehicle by means of a bracket 4. The motor shaft 2 vertically projects from the lower surface of the motor yoke 3. A metal plate 12 attached to fan boss portion 5 is attachedly fitted to the lower end of the projecting motor shaft 2. The fan boss portion 5 is formed into a bottomed cylindrical shape having an open upper portion, a bottom 5a opposite to the lower surface of the motor yoke 3, and an outer cylinder 5b having a double structure, the outer cylinder 5b being opposite to the outer periphery of the motor yoke 3. Several wing bodies 6 are integrally formed on the outer periphery of the outer cylinder 5b.

A plurality of concentric circular ribs $7_i$ ($i=1, 2,$ or $3$) are provided at certain intervals on the bottom 5a of the fan boss portion 5 so as to project toward the lower surface of the motor yoke 3. The bottom 5a is partitioned into a plurality of rooms $R_i$ ($i=1, 2, 3,$ or $4$) by the ribs $7_i$ and the floors of the enclosed rooms $R_i$ are formed in steps so their floors are successively lowered from room $R_1$ in the direction toward the outer peripheral side room $R_4$. Each of the ribs $7_i$ is formed with a plurality of notches 7a which permit the adjacent enclosed rooms $R_i$ to communicate with each other. The notches 7a of the adjacent ribs $7_i$ are formed so they are offset from each other in the peripheral direction by being placed on different radial lines. In addition, a plurality of drainage holes 8 are formed in the enclosed room $R_4$ in the outermost periphery so that any water that enters one of the rooms $R_i$, flows to the enclosed room $R_4$ in the outer periphery while being guided by the water guide passages formed by the notches 7a and the successively lowered floors of the rooms $R_i$. The water is then discharged to the outside through the drainage holes 8. Reference numeral 9 denotes drain passages from the enclosed room $R_1$ on the innermost peripheral side.

Reference numeral 10 denotes a shield ring which is integrally fixed to the lower surface of the motor yoke 3 and which has a collar-shaped lower end 10a. The collar-shaped lower end 10a is inserted into the portion between the ribs $7_i$ to form a labyrinth structure. The shield ring 10 also forms, together with the ribs $7_i$, a waterproof structure for preventing the water which enters through the gap between the motor yoke 3 and the outer cylinder 5b, from entering the inside of the motor through a motor bearing portion 11.

In the embodiment of the present invention configured as described above, the fan boss portion 5 having a bottomed cylindrical shape and an open upper side is fitted to the lower end of the vertical motor shaft 2 of the fan motor 1 for cooling a capacitor or the like so that the motor bearing portion 11 is not splashed with water from the lower side. Even if water enters the fan boss portion 5 through the gap between the motor yoke 3 and the outer cylinder 5b of the fan boss portion 5, the combined structure of fan boss portion and shield ring 10 prevents the water from entering the inside of the fan motor 1.

The water, which enters the fan boss portion 5 through the gap between the motor yoke 3 and the outer cylinder 5b, is inhibited from entering the fan motor 1 by the plurality of ribs $7_i$ and the shield ring 10. Any water which does manage to get beyond the ribs $7_i$ and the shield ring 10 stays within the inner rooms $R_1$ and $R_2$ enclosed by the ribs $7_1$ and $7_2$. However, water in the inner enclosed rooms $R_1$ and $R_2$ then flows to the outer enclosed rooms $R_3$ and $R_4$ along the water guide passages formed by the notches 7a and the floors of the enclosed rooms $R_i$ which are successively lowered in the direction toward the outer periphery. There the water is surely and rapidly discharged to the outside through the drainage holes 8 formed in the enclosed rooms $R_4$ in the outermost periphery.

Further, since the water guide passages are such, that is, the notches 7a of the adjacent ribs $7_i$ are circumferentially offset from one another so as to be placed on different radial lines and the floor of rooms $R_i$ are successively lowered toward the outer peripheral side, even if water enters the fan boss portion 5 through the drainage holes 8, it is extremely unlikely water will flow toward the inner area of the fan boss portion 5, particularly when the fan is operating. As a result, the present invention exhibits excellent waterproofing characteristics thereby effectively protecting the fan motor 1 from water and facilitating a long life for the fan motor 1.

In the present invention as described above, the bottomed cylindrical fan boss portion, which is open at its upper side, is mounted on the vertical motor shaft so that the motor shaft is not directly splashed with water from the outside. Water, which may enter a central portion of the fan boss portion, is intercepted by the ribs $7_i$ formed on the bottom of the fan boss portion and thus inhibited from entering the inside of the fan motor. Any water which penetrates beyond the ribs generally is trapped in the rooms $R_i$ enclosed by the ribs. However, the trapped water then flows toward the outer enclosed rooms while being guided by the water guide passages formed by the ribs $7_i$ and the floors of the enclosed rooms $R_i$. Because the floors are successively lowered in the direction of the outer periphery, the water does not flow backward toward the motor shaft. The water finally flows to the enclosed room $R_4$ in the outermost periphery and is discharged to the outside therefrom.

Further, because the water guide passages are formed into a maze-like shape in which the bottom floor is lowered in a stepwise manner toward the outer periphery, and the positions of the notches of the adjacent ribs are offset from one another so as to be on different radial lines, even if water enters from the drainage holes, water is prevented from flowing toward the motor shaft side, thereby excellent waterproofing with a high reliability is obtained.

What is claimed is:

1. A waterproof structure for a covered fan motor having a vertical motor shaft projecting from the cover, comprising:
   a fan boss mounted to the motor shaft, said fan boss having a cylindrical center portion closed at an end away from the motor cover and open at an end adjacent to the motor cover;
   at least two circumferential ribs extending upwardly from an upper surface of said closed end to partition an inner area of said cylindrical center portion into enclosed rooms;
   at least one notch in each said rib to interconnect radially adjacent enclosed rooms, said notches in adjacent said ribs are radially offset from one another; and
   at least one drainage hole provided in a most outer one of said enclosed rooms formed on said upper surface of said closed end.

2. A structure as claimed in claim 1, wherein in a radially outward direction from the motor shaft, a floor of adjacent said enclosed rooms is stepwise lowered.

3. A structure as claimed in claim 2, wherein said at least one drainage hole is placed in said floor of said enclosed room at the greatest radially outward direction from the motor shaft.

4. A structure as claimed in claim 1, further comprising a metal plate providing the means for fixedly mounting the fan boss portion to the motor shaft.

5. A waterproof structure for a fan motor having a vertical motor shaft projecting from a lower surface of a motor yoke, comprising: a cylindrical fan boss portion which has a bottomed end away from the lower surface of the motor yoke, an open end adjacent to the lower surface of the motor yoke, and an outer cylinder opposite to an outer periphery of the motor yoke, said fan boss portion mounted to the motor shaft at the center of said bottomed end, wherein an inner surface of said bottomed end facing the lower surface of the motor yoke has thereon at least two concentric circular rib forming a plurality of enclosed rooms having floors which are successively lower in the direction toward an outer periphery of said bottom surface, each said rib having at least one notch for allowing adjacent enclosed rooms to communicate with each other, said notches of the adjacent ribs offset from one another in the circumferential direction so as to be placed on different radial lines to provide a maze-like water guide passage for guiding water which enters an inner portion of said fan boss portion to the outer enclosed rooms, at least one drainage hole formed in said floor of said most outer enclosed room at said outer periphery for the purpose of discharging said water guided thereto to the outside of said bottomed end.

6. A structure as claimed in claim 5, wherein said each said rib has at least three notches.

7. A structure as claimed in claim 5, wherein each said notch in each said rib is offset from a corresponding notch in an adjacent rib by 60°.

8. A structure as claimed in claim 5, further comprising a metal plate providing the means for fixedly mounting the fan boss portion to the motor shaft.

* * * * *